United States Patent [19]
Gulick et al.

[11] Patent Number: 4,952,036
[45] Date of Patent: Aug. 28, 1990

[54] HIGH RESOLUTION LCD DISPLAY SYSTEM

[75] Inventors: Paul E. Gulick, Tualatin; Arlie R. Conner, Portland, both of Oreg.

[73] Assignee: In Focus Systems, Inc., Tualatin, Oreg.

[21] Appl. No.: 378,997

[22] Filed: Jul. 12, 1989

Related U.S. Application Data

[63] Continuation-in-part of Ser. No. 363,099, Jun. 7, 1989, which is a continuation-in-part of Ser. No. 329,938, Mar. 28, 1989.

[51] Int. Cl.$^5$ .............................................. G02F 1/13
[52] U.S. Cl. ..................................... 350/335; 350/333; 350/336; 350/347 E
[58] Field of Search ............... 350/335, 333, 336, 345, 350/334, 331 R, 347 E

[56] References Cited

U.S. PATENT DOCUMENTS

| | | | |
|---|---|---|---|
| 4,443,063 | 4/1984 | Togashi et al. | 350/335 X |
| 4,448,490 | 5/1984 | Shibuya | 350/335 |
| 4,449,123 | 5/1984 | Muranaga et al. | 350/335 X |
| 4,641,923 | 2/1987 | Bohmer et al. | 350/335 |
| 4,756,604 | 7/1988 | Nakatsuka | 350/331 R |
| 4,790,632 | 12/1988 | Miyakawa et al. | 350/334 X |
| 4,798,448 | 1/1989 | Van Raalte | 350/345 |
| 4,810,058 | 3/1989 | Sangyoji et al. | 350/331 R |

OTHER PUBLICATIONS

Kinugawa et al, "Highly Multiplexed STN-LCDs", SID Digest, pp. 386-389, 1989.
Kuwagaki et al, "Development of White Mode LDC," Sharp Tech. Journal, No. 39, pp. 105-108 (Abstract only), 1988.
Katoh et al, "Application of Retardation Compensation," Japan J. Appl. Phys., vol. 26, No. 11, pp. L1784-6 (Abstract only), Nov., 1987.
IBM TDB, vol. 29, No. 11, pp. 1855-1856, Apr., 1987.

*Primary Examiner*—Stanley D. Miller
*Assistant Examiner*—Huy K. Mai
*Attorney, Agent, or Firm*—Klarquist, Sparkman, Campbell, Leigh & Whinston

[57] ABSTRACT

A high resolution LDC display is fabricated with a plurality of panels. Each panel has active rows and inactive rows. The panels are stacked and aligned so that each active row is in alignment with inactive rows in all the other panels of the stack. The parallax problem inherent with this stacked cell approach is eliminated by a lens system that collimates light illuminating the stacked assembly.

2 Claims, 4 Drawing Sheets

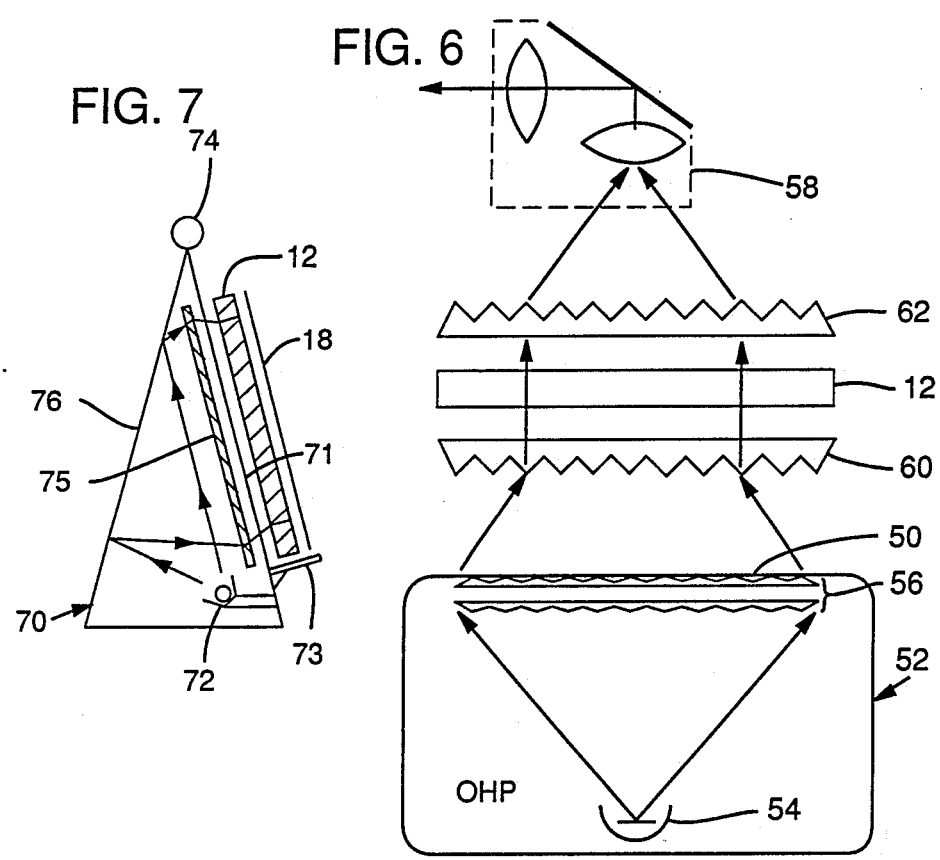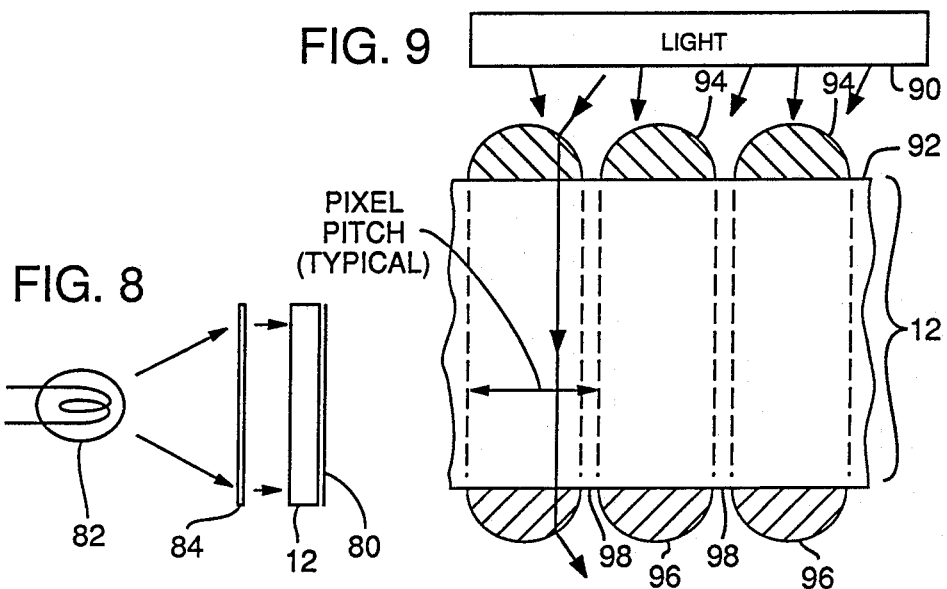

HIGH RESOLUTION LCD DISPLAY SYSTEM

RELATED APPLICATION DATA

This application is a continuation-in-part of copending application Ser. No. 07/363,099, filed June 7, 1989, which in turn is a continuation-in-part of copending application Ser. No. 07/329,938, filed Mar. 28, 1989.

FIELD OF THE INVENTION

The present invention relates to LCD display systems, and more particularly relates to display systems employing a plurality of LCD panels in series stacked arrangement to permit increased display resolution.

BACKGROUND AND SUMMARY OF THE INVENTION

LCD panels are finding increasing applicability in sophisticated display devices. A drawback to their further exploitation, however, is their relatively limited resolution.

The resolution of LCD panels is limited both by interconnection constraints and by the electrical properties of the liquid crystal material itself. Taking this latter limitation first, in any multiplexed LCD display, each cell must be electrically refreshed periodically, typically 30 or 60 times a second, to maintain its desired state. This is effected by repetitively scanning down the panel, refreshing each row in turn. The greater the resolution of a panel, the greater the number of rows that must be refreshed at this rate. Beyond a certain limit, the period allotted to refreshing each row becomes too short to refresh it effectively. Thus, a minimum refresh period limits the number of rows that can be refreshed at the requisite rate. This number is about 250-300 rows with current liquid crystal materials.

In the prior art, displays with twice this number of rows have been achieved by duplicating the refresh circuitry so that half the rows of the panel are refreshed by one circuit and half are refreshed by the other. Thus, at any instant, two rows are being refreshed—one by one circuit and one by the other. However, this technique still only permits 500 or so rows of resolution. Truly high resolution applications demand substantially more rows.

The obstacle to refreshing more than 500 rows is the interconnection limitation. The refresh circuitry must connect to each column of pixels on the display. There may be 640 or more such columns. By partitioning the display into top and bottom portions, the two requisite 640 wire connections can be made—one along the top of the display and one along the bottom. However, this partitioning approach cannot be extended to a three- or more way division because there is no way to make the requisite interconnect to intermediate portions of the display.

The interconnect limitation is generally accepted to be an absolute bar to arbitrarily-high resolution LCD displays, as noted in "Scanning Limitations of Liquid Crystal Displays" by P. M. Alt et al, IEEE Trans. Electron Devices, Vol. ED-21, pp. 146-155 (1974); and "Ultimate Limits for Matrix Addressing of RMS-Responding L. C. D.'s" by J. Nehring et al, IEEE Trans. Electron. Devices, Vol. ED-26, p. 795-802 (1979).

It is a principal object of the present invention to provide a display that circumvents both the electrical and interconnect limitations, permitting fabrication of LCD displays of virtually unlimited resolution.

In accordance with the present invention, a composite display is fabricated with a plurality of panels. Each panel has active rows and inactive rows. The panels are stacked and aligned so that each active row is in alignment with inactive rows in all the other panels of the stack. The parallax problem inherent with this stacked cell approach is eliminated by a lens system that collimates light illuminating the stacked assembly. The limited viewing angle associated with collimated illumination is overcome by an exit optic that may either focus or disperse the exiting light for viewing.

The foregoing and additional objects, features and advantages of the present invention will be more readily apparent from the following detailed description thereof, which proceeds with reference to the accompanying drawings.

BRIEF DESCRIPTION OF THE DRAWINGS

FIG. 6 is a view of a display system using a display subassembly according to the present invention in conjunction with a conventional overhead projector.

FIG. 7 is a view of a display stand according to the present invention.

FIG. 8 shows a direct view display system according to the present invention.

FIG. 9 shows another direct view display system according to the present invention.

DETAILED DESCRIPTION

Figure 1:
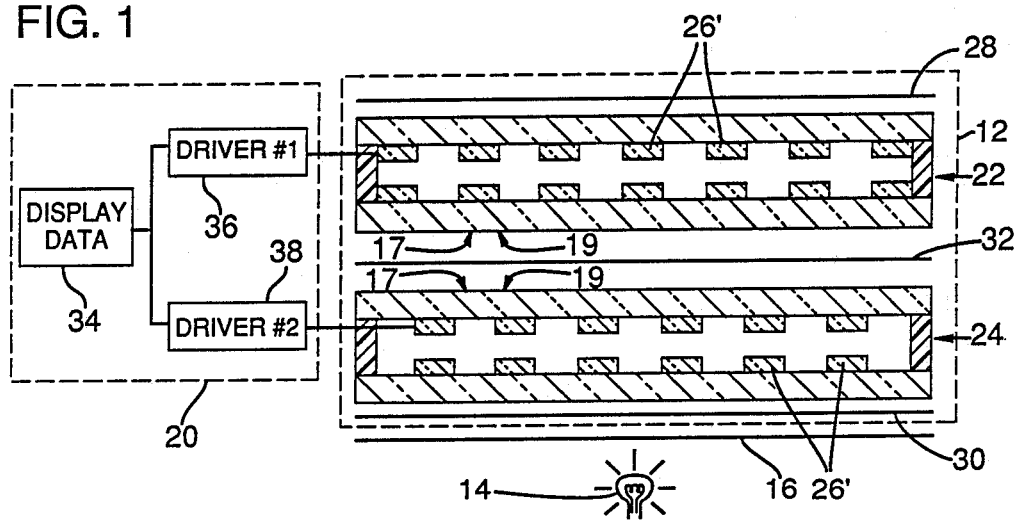
FIG. 1 is a partial schematic side view of a high resolution display system according to one embodiment of the present invention.
Figure 2:
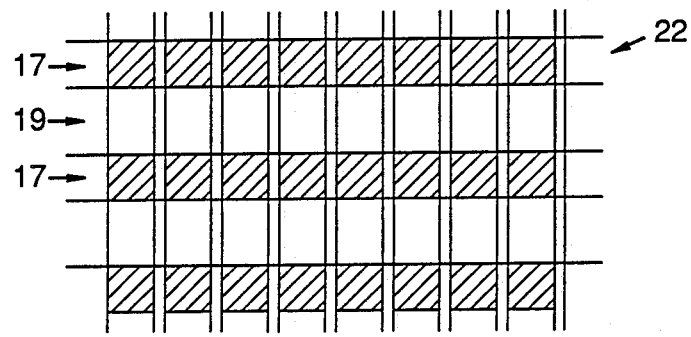
FIG. 2 is a partial top view of an LCD panel used in the display subassembly of FIG. 1.

Referring to FIG. 1, a display system 10 according to one embodiment of the present invention includes a display subassembly 12, an illumination source 14, an entrance optic 16, an exit optic 18, and display driver circuitry 20.

The display subassembly 12 includes first and second panels 22, 24. Each has associated therewith a plurality of transparent electrodes 26 that can be controllably energized to change the state of the liquid crystal material sandwiched therebetween. In the illustrated panels, the electrodes are arranged in rows 17 that define active areas, interlaced with rows 19 without electrodes, which define inactive areas. The two panels are stacked and aligned so that the active rows of one panel are in optical alignment with the inactive rows of the other panel. By this arrangement, the composite subassembly provides twice the number of rows of either panel by itself, yet avoids the fabrication difficulties associated with putting all these active rows on a single panel.

Figure 3:
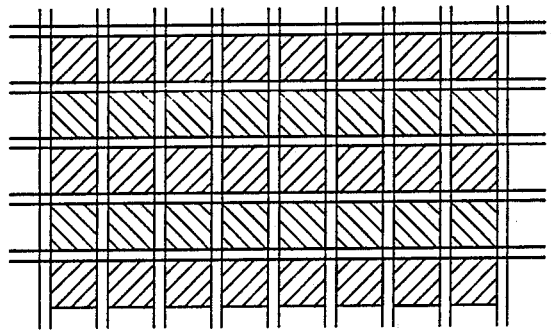
FIG. 3 is a partial top view of the subassembly of FIG. 1.

In the illustrated embodiment, each of the panels 22, 24 is fabricated with 512 active rows of 1280 horizontal pixels each. The composite display thus has a resolution of 1024×1280. FIG. 3 is a partial top view of the stacked subassembly 12 showing the interlacing of rows.

Sandwiching the two LCD panels 22, 24 are first and second polarizers 28, 30. In the FIG. 1 embodiment, a third polarizer 32 is interposed between the panels.

The display driver circuitry 20 includes a source 34 of display data, such as a computer or the like, and first and second driver circuits 36, 38. The first driver circuit 36 operates to receive display data from the source 34 and to provide data corresponding to the first, third, fifth video rows, etc, to driver circuitry that operates the active rows in the first panel 22. This driver circuitry is conventional and operates by partitioning the panel into top and bottom halves and refresh-scanning both halves simultaneously, as described in the Background of the Invention section. The first driver circuit 36 ignores the data relating the second, fourth, etc. rows. The second driver circuit 38 performs likewise with the second, fourth, sixth, etc. rows.

The display driver circuitry 20 used in the illustrated embodiment is also conventional, being another application of the well known display drivers that control two scans simultaneously.

The FIG. 1 embodiment can be practiced with virtually any LCD construction, such as twisted nematic, supertwisted nematic, double supertwisted nematic, etc. Double supertwisted nematic is particularly desirable in high resolution displays because it can provide a virtually true black and white image, as opposed to the color tinted images produced by the other technologies. In double supertwisted nematic panel construction, an additional, passive liquid crystal cell is used in conjunction with the primary liquid crystal cell to compensate for optical wavelength dependence in the primary cell. The passive cell is essentially identical to the primary cell except it has an opposite twist sense.

Figure 4:
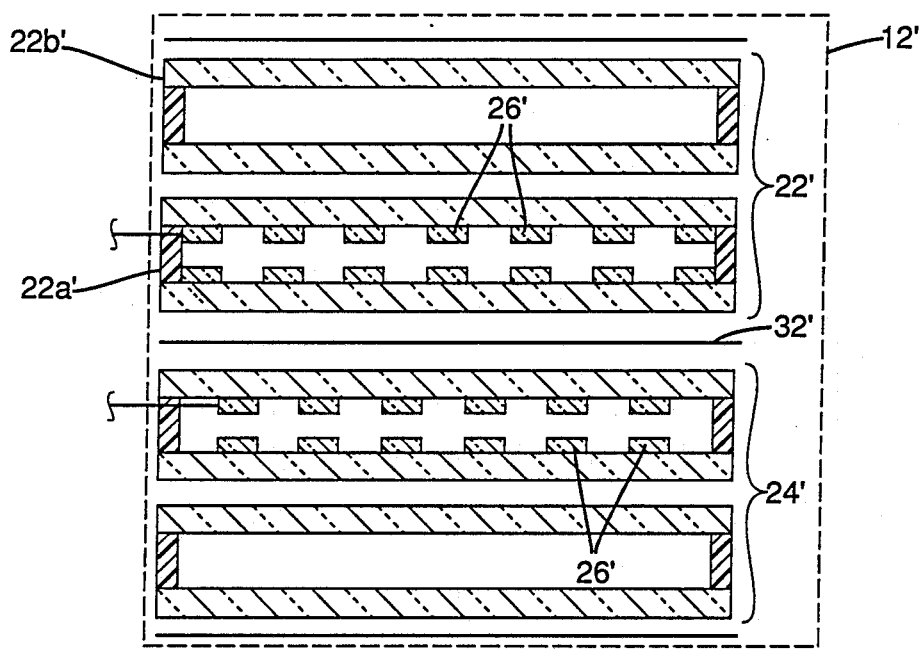
FIG. 4 is a partial side view of a display subassembly using double cells that may be employed in the display system of FIG. 1.

FIG. 4 shoWs a display subassembly 12' using double supertwisted panels. The first panel 22' includes an operative panel 22a' and a passive panel 22b'. The operative panel 22a' includes electrodes 26' and is operated in conjunction with the passive panel 22b' that is fabricated without electrodes and with an opposite twist sense. The second panel 24' is constructed similarly.

Figure 5:
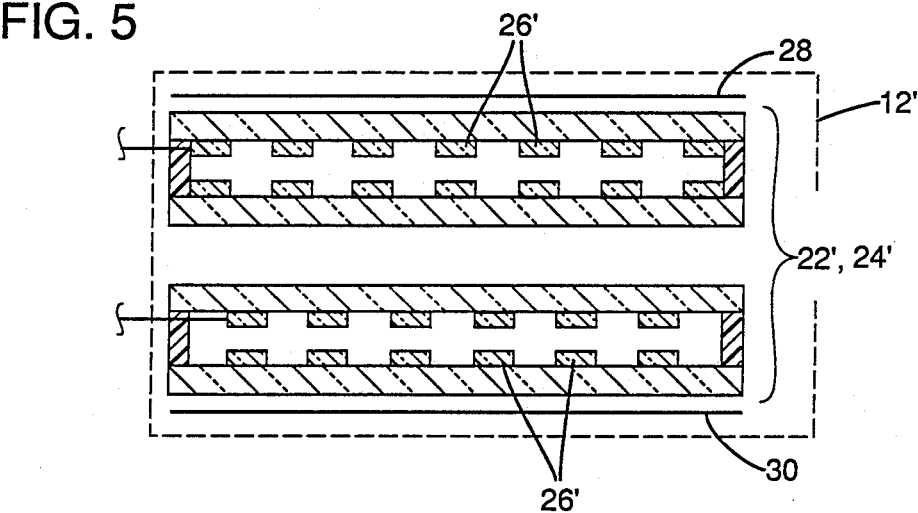
FIG. 5 is a partial side view of a display subassembly using a different implementation of double cells that may be employed in the display system of FIG. 1.

The construction of the double supertwisted display subassembly of FIG. 4 can be simplified considerably by fabricating the first and second primary panels to have opposite twist senses. In such an embodiment, the inactive portions of one panel serve as the passive, reverse twist counterparts to the active portions of the other panel. Such an embodiment is shown in FIG. 5. In addition to eliminating two liquid crystal layers, this embodiment also permits the intermediate polarizer 32' to be omitted.

In order for these stacked panel display subassemblies to work without parallax limitations, the entrance optic 16 desirably collimates the illumination from the light source 14 in a direction orthogonal to the panels. This entrance optic 16 can take many forms, as discussed below. The collimated light exiting the display subassembly is also typically processed by an exit optic 18 which can either focus the light for projection on a viewing surface, or can simply disperse the light for direct viewing.

Referring to FIG. 6, in a first application the display subassembly 12 is positioned on the transparent projection surface 50 of a conventional overhead projector 52. Such projectors typically include an illumination bulb 54 and a Fresnel lens 56 under the projection surface to produce light beams that pass through a transparency and converge onto a projection lens assembly 58. (Due to the short focal length and high power required of lens 56, this lens is often formed by cementing two or more lower powered Fresnel lenses together.)

When display subassembly 12 is used in the FIG. 6 application, it is desirable to provide a Fresnel lens 60 as the entrance optic to collimate the converging light from the projection surface prior to illumination of the display subassembly. The light exiting the subassembly is then refocused by a exit optic lens 62 (which is also desirably in Fresnel form) onto the projection lens assembly 58. (Lens 62 here serves the same purpose as the Fresnel lens provided under the projection surface of the projector in the projector's normal operation, namely to focus light towards the projection lens assembly 58.)

If it is desired to use the FIG. 6 display system in a direct view arrangement, a backlit viewing stand 70 shown in FIG. 7 may be employed. This stand has a light-transmitting surface 71 against which the display 12 can rest, and an internal light source 72 for directing illumination through the light-transmitting surface. A small shelf 73 on which the display can be positioned is provided on the exterior of the stand.

The stand 70 is desirably collapsible to permit ready portability. This can be achieved with a hinge and bellows arrangement 74. A small size can be maintained by using folded optics that include mirroring on the inside back wall 76 of the stand.

The stand 70 is also desirably provided with optics that emulate the optics of a conventional overhead projector. That is, these optics focus light incident on the display 12 so that it converges on a point a short distance away. In the illustrated embodiment, these optics comprise a Fresnel plate lens 75. The Fresnel entrance optic 60 used with the display 12 in the FIG. 6 embodiment (present but not particularly shown in FIG. 7) again collimates this focused light prior to its illumination of the display subassembly.

In this application, the exit optic 18 is a simple translucent dispersion medium, such as a ground glass plate or a commercially available diffusion material (i.e. Rolux film manufactured by Rosco of Port Chester N.Y.).

It will be recognized that the viewing stand 70 advantageously permits an LCD display to be used either as a projection device for large audiences (i.e. as an "electronic transparency"), or as a single-user computer screen. Such multiple functionality for an LCD display has not heretofore been available.

A second application of the high resolution display subassembly 12 is as a dedicated backlit screen for a computer or the like. In this application, shown in FIG. 8, the subassembly 12 is illuminated with collimated light, and a translucent light dispersing material 80 is mounted adjacent the first polarizer 28 to display the resulting image. The collimated excitation light can be provided from a relatively low wattage bulb 82 in conjunction with a thin lens 84.

In a related embodiment shown in FIG. 9, a direct view display may be illuminated by a fluorescent light panel 90. In such embodiment, the display subassembly 12 is fabricated with an entrance plate 92 on which are formed a plurality of microlenses 94, one aligned to each pixel of the display. Light incident on one of microlenses 94, regardless of its orientation, is directed normal to the plane of the display subassembly 12 and thus passes through the pixels of the component layers in the proper alignment.

The same arrangement may be used on the exiting side of the display. In this case, collimated light exiting the subassembly 12 is dispersed by microlenses 96 which permit the resultant image to be viewed from a wide range of angles without parallax effects. The interstitial areas 98 between the lenses may be colored black to minimize stray light and to improve perceived contrast. Alternatively, the exit optic can be a simple light dispersing medium, such as the ground glass plate 80 shown in FIG. 8.

Figure 10:
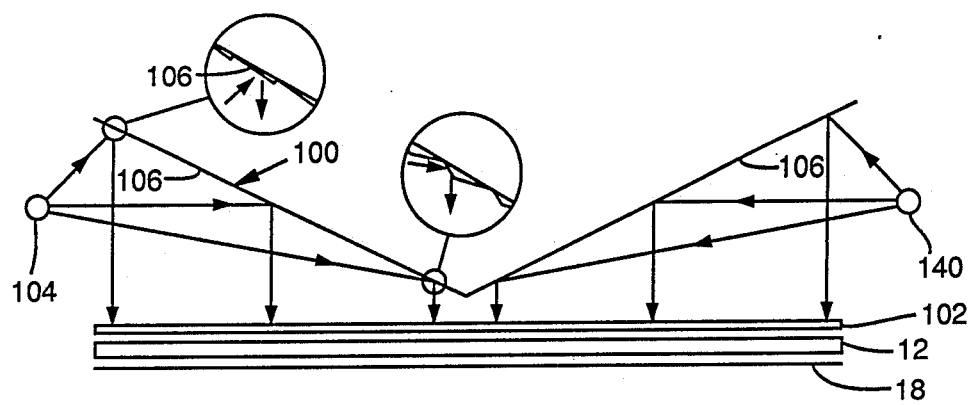
FIG. 10 shows yet another direct view display system according to the present invention.

In still a further variation of the direct view embodiment, the incident light can be collimated by a novel arrangement employing a parabolic mirror 100 (desirably in Fresnel form) and a micro-venetian blind material 102. As shown in FIG. 10, this embodiment is illuminated by a pair of linear light sources, such as fluorescent bulbs 104. These bulbs illuminate a generally flat mirrored surface 106 that has facets arranged to provide one axis of collimation. The angles of the facets vary with placement on the surface to simulate a sectioned parabolic reflector. Light reflected from this mirrored surface is substantially collimated. However, to remove any stray off-axis light, a micro-venetian blind material 102, such as Light Control Film marketed by 3M Corp, is desirably placed between the mirror and the display subassembly. This material is a thin plastic film containing closely spaced black microlouvers to absorb light misaligned with respect to the louvers. By this arrangement, a very compact and efficient display can be provided.

From the foregoing description, it will be recognized that the present invention overcomes the electrical and interconnection constraints that have previously limited liquid crystal displays to relatively low resolution applications.

Figure 11:
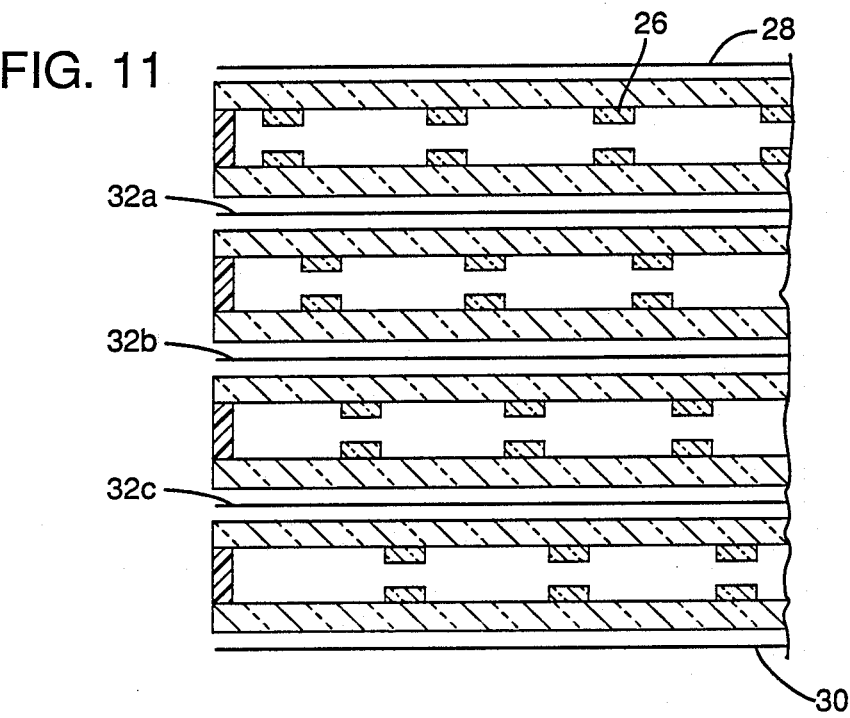
FIG. 11 is a partial side view of a display subassembly in which the active rows are distributed over four panels.

Having described and illustrated the principles of our invention with reference to a preferred embodiment and several variations thereon, it should be apparent that the invention can be modified in arrangement and detail without departing from such principles. For example, while the display subassembly has been described as having its active rows distributed between two stacked panels, it will be recognized that in alternative embodiments the active rows may be distributed among three or more panels to attain still higher resolution. Such an arrangement, employing active rows on four panels, is shown in FIG. 11. Similarly, while the display subassembly has been described as having active rows on one panel interlaced with active rows on another panel, it will be recognized that the rows need not be interlaced. Instead, for example, one panel may have a plurality of contiguous rows that form the top portion of the display, and the second panel may have a plurality of contiguous rows that form the bottom portion of the display. Finally, while the display subassembly has been described as providing a monochromatic display, it will be recognized that several such displays can be stacked and operated cooperatively to provide a full color display. In one such embodiment, one display (comprised of two or more stacked panels) can be tuned to switch between the colors cyan and white, a second display can be tuned to switch between magenta and white, and a third display can tuned to switch between yellow and white. These three displays, stacked with polarizers (which may be colored for increased transmissivity) can yield a high resolution full color display.

In view of these and the wide variety of other embodiments to which the principles of our invention may be applied, it should be recognized that the illustrated embodiments are to be considered illustrative only and not as limiting the scope of the invention. Instead, we claim as our invention all such modifications as may come within the scope and spirit of the following claims and equivalents thereto.

We claim:

1. A method of providing a high resolution display comprising the steps:
   providing a first liquid crystal cell of the supertwisted nematic type;
   operating the first liquid crystal cell to define a first display row;
   compensating wavelength-dependent optical effects exhibited by the first display row by providing a second liquid-crystal cell of the supertwisted nematic type in an optical assembly with said first cell, said second cell having opposite twist sense from the first cell and presenting a passive area in superimposed relationship with the first display row, said passive area in the second cell providing an opposite twist counterpart to the first display row, thereby compensating for the first display row's wavelength dependent effects;
   operating said second liquid crystal cell to define a second display row;
   compensating wavelength-dependent optical effects exhibited by the second display row by providing in the first liquid crystal cell a passive area in superimposed relationship with the second display row, said passive area providing an opposite twist counterpart to the second display row, thereby compensating for its wavelength dependent effects.

2. The method of claim 1 which further includes:
   providing a source of illumination;
   collimating the illumination;
   passing the collimated light through the first and second cells; and
   dispersing the collimated light after passing through the first and second cells.

* * * * *

UNITED STATES PATENT AND TRADEMARK OFFICE
CERTIFICATE OF CORRECTION

PATENT NO. : 4,952,036

DATED : August 28, 1990

INVENTOR(S) : Gulick, et al.

It is certified that error appears in the above-identified patent and that said Letters Patent is hereby corrected as shown below:

ON TITLE PAGE: OTHER PUBLICATIONS for the Kuwagaki reference, change "LDC" to --LCD--.

In the ABSTRACT, line 1, change "LDC" to --LCD--.

In the BACKGROUND AND SUMMARY OF THE INVENTION, column 1, line 28, change "30" (BOLD) to --30-- (UNBOLD).

In the BACKGROUND AND SUMMARY OF THE INVENTION, column 1, line 28, change "60" (BOLD) to --60-- (UNBOLD).

In the BACKGROUND AND SUMMARY OF THE INVENTION, column 1, line 47, change "500" (BOLD) to --500-- (UNBOLD).

In the DETAILED DESCRIPTION, column 3, line 42, change "shoWs" to --shows--.

In the DETAILED DESCRIPTION, column 4, line 46, change "!8" to --18--.

Signed and Sealed this

Twenty-fifth Day of February, 1992

*Attest:*

HARRY F. MANBECK, JR.

*Attesting Officer*  *Commissioner of Patents and Trademarks*